United States Patent [19]

Bellin et al.

[11] Patent Number: 5,440,177
[45] Date of Patent: Aug. 8, 1995

[54] INTEGRATED AUTO-THEFT PREVENTION SYSTEM

[75] Inventors: Howard T. Bellin, New York; Robert P. Dingwall, Stratford, both of N.Y.

[73] Assignee: Motor Vehicle Protection Systems, Inc., New York, N.Y.

[21] Appl. No.: 60,026

[22] Filed: May 10, 1993

[51] Int. Cl.6 ............................................ B60R 25/04
[52] U.S. Cl. ...................... 307/10.5; 180/287; 340/825.3
[58] Field of Search .................... 307/10.1–10.5; 180/287; 70/DIG. 46, 241, 278, 264; 361/172; 340/825.31, 825.3, 825.32, 825.34, 825.54, 825.56; 123/198 B, 198 DC

[56] References Cited

U.S. PATENT DOCUMENTS

| | | | |
|---|---|---|---|
| 4,180,043 | 12/1979 | Kawamura | 180/287 |
| 4,209,709 | 6/1980 | Betton | 180/287 |
| 4,438,426 | 3/1984 | Adkins | 340/825.32 |
| 4,452,197 | 6/1984 | Weber | 180/287 |
| 4,990,906 | 2/1991 | Kell et al. | 340/825.32 |
| 5,133,426 | 7/1992 | Niriella et al. | 307/10.2 |
| 5,229,648 | 7/1993 | Sues et al. | 307/10.2 |

Primary Examiner—A. D. Pellinen
Assistant Examiner—Richard T. Elms
Attorney, Agent, or Firm—Hopgood, Calimafde, Kalil & Judlowe

[57] ABSTRACT

A motor vehicle theft protection system employs a pre-set distortion in the vehicle timing system to preclude unauthorized access to the vehicle. The system uses a key containing codes corresponding to the timing off-set. Without the codes, the timing off-set prevents operation of the vehicle.

11 Claims, 11 Drawing Sheets

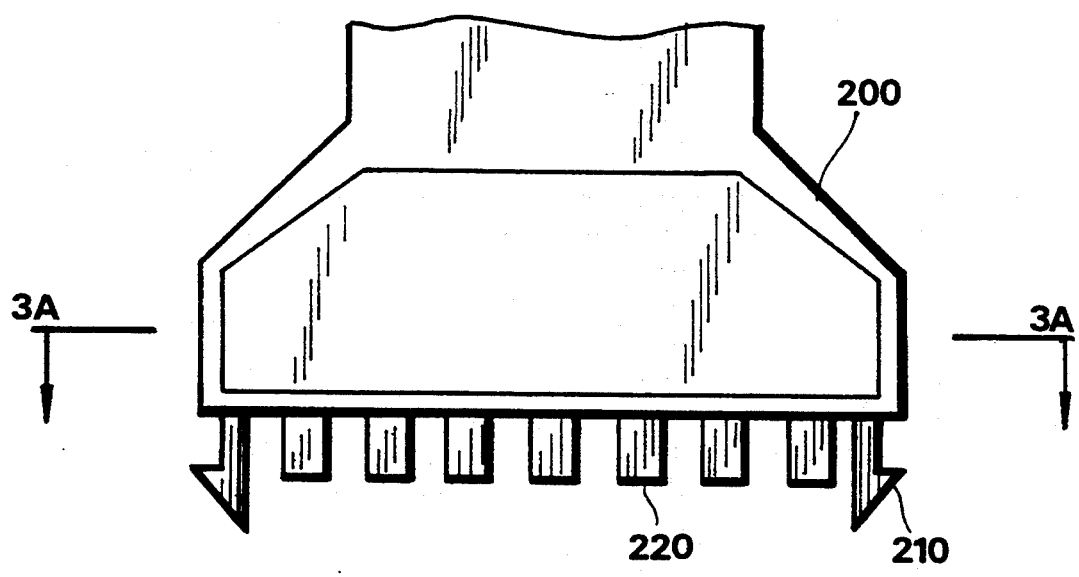
FIG.3
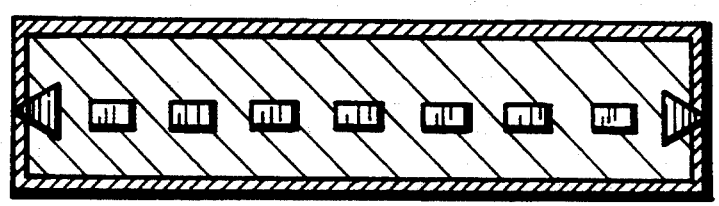
FIG. 3A
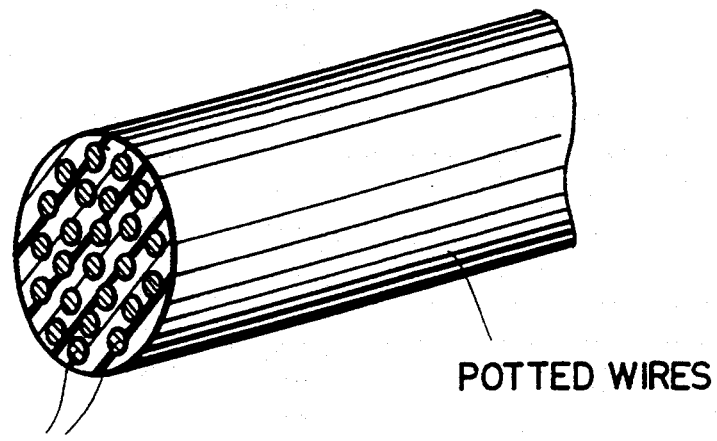
DUMMY  FIG. 4  POTTED WIRES

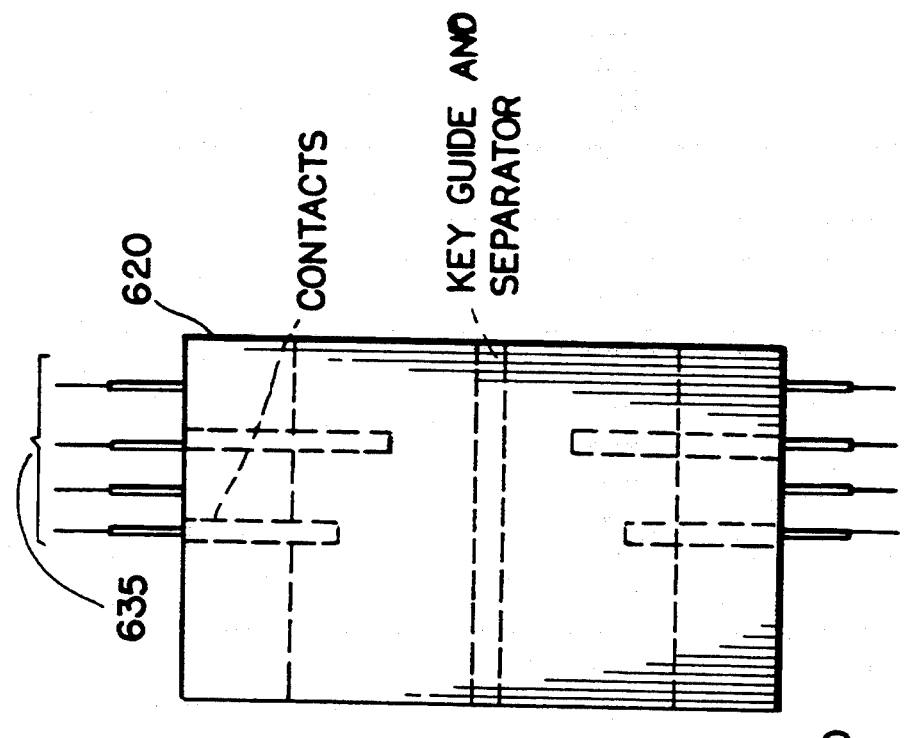
FIG. 12C
FIG. 12B
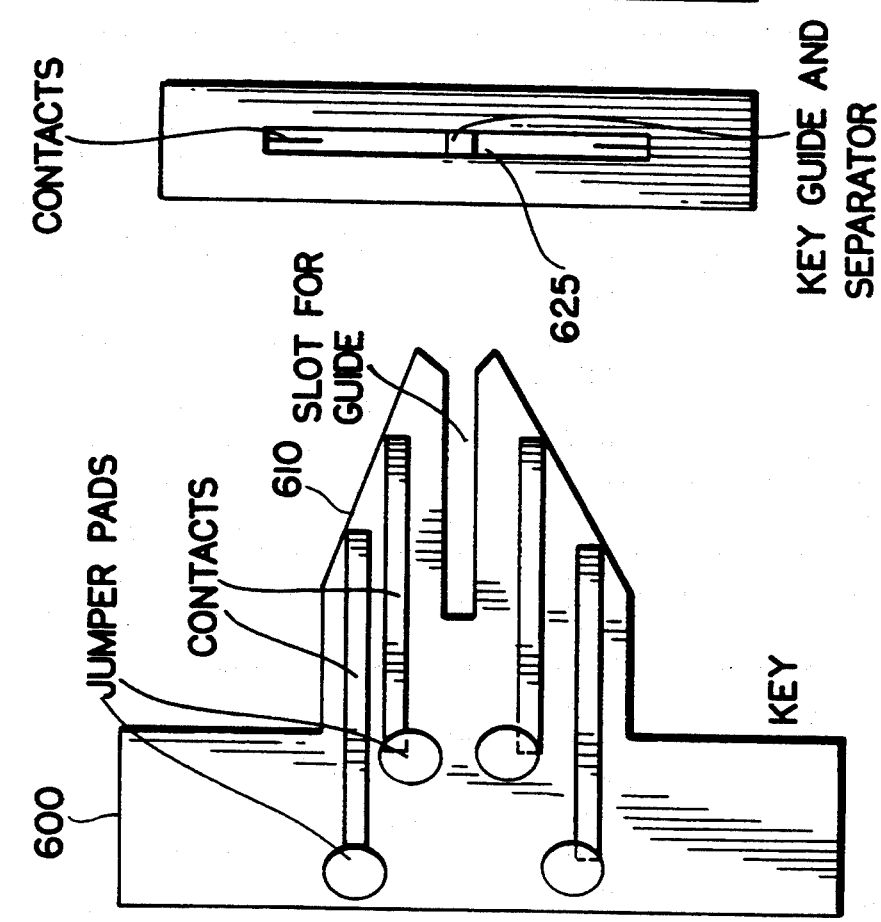
FIG. 12A

INTEGRATED AUTO-THEFT PREVENTION SYSTEM

The present invention relates generally to a system to prevent the unauthorized operation of a motor vehicle, and more specifically, an integrated system of interlocking hierarchial barriers to prevent the unauthorized operation of the engine in a motor vehicle.

BACKGROUND OF THE INVENTION

Although a long known and well recognized crime, auto-theft has taken even greater significance in recent years as the level of theft has exploded and the corresponding value of the stolen property has increased in proportion. Rising concern over this crime is paramount due to the increasing violence that often accompanies the theft and the tremendous burden that the volume of theft imposes on society via increased insurance premiums.

Simply stated, the typical theft of an automobile takes less than 5-7 minutes and involves the rapid disablement of the locked steering column and the hot wiring of the ignition system. This permits the movement of the vehicle under its own power from its parked location (usually public) to a distant and private location for disassembly (known as a "chop shop"). The key to the successful completion of this crime requires two elements—the ability to start the car in a short amount of time and the ability to drive the car to a private location.

Many efforts have been made to interfere with the theft of a motor vehicle, ranging from the simple use of steel locking mechanisms place on the steering column to exotic electronic tracking systems and alarms. For the most part, these prior efforts have been largely fruitless as the increasing value of the vehicle has propelled the thieves into actions equally as tricky as the mechanism used to preclude theft. Sophisticated alarm systems are routinely disarmed by the knowledgeable disablement of power sources. Tracking systems are shielded prior to departure and steel barriers are treated with liquid nitrogen rendering the steel brittle and susceptible to shattering. In each instance, the thief is able to start and move the vehicle within minutes—thus lowering his/her exposure to capture. Accordingly, a significant need has remained largely unmet and vehicles remain vulnerable to theft.

SUMMARY AND OBJECTS OF THE PRESENT INVENTION

It is an object of the present invention to provide a system for use in an automobile that creates a barrier to both a rapid access to the ignition system, and use of the vehicle for movement to a new location.

It is another object of the present invention to provide a system of interlocking barriers that create a time period for unauthorized ignition that is prohibitively long in light of possible capture.

It is yet another object of the present invention to layer several time consuming barriers to unauthorized ignition in a manner that precludes systematic penetration.

It is another object of the present invention to provide a system for preventing unauthorized ignition of a motor vehicle while preserving rapid authorized ignition in accordance with present day expectations.

The above and other objects of the present invention are realized in an integrated ignition barrier system that is linked to the ignition and distributor system of a motor vehicle and engineered in cooperation with these components so that proper timing of the distributor can only be realized by utilization of a specialized ignition key system. More particularly, the ignition key includes a circuitry representing a coded value corresponding to a timing delay function placed into the distributor system. In conjunction therewith, the distributor of the car is purposely mis-timed to include a pre-set delay. A separate distributor controller receives the coded value from the ignition circuit and, if a match exists, provides the timing signal with appropriate delay to the signal from the mis-timed car's distributor correcting the timing to permit operation.

Alternatively, if an effort is made to "hot wire" the car without the proper coded value in the ignition key, the distributor timing delay is not provided and the timing of the distributor is offset by the finite value—thus precluding engine ignition.

In accordance with the varying aspects of the above invention, the foregoing timing delay system is further coupled to a hierarchy of supplemental ignition barriers that include dummy cables, hardened steel connectors with one way fasteners, arranged in a manner to preclude rapid access to the distributor system. Integrated in accordance with this teaching, the foregoing features provide an almost impenetrable barrier to rapid car but unauthorized operation.

BRIEF DESCRIPTION OF THE DRAWINGS

The foregoing features of the present invention may be more fully appreciated in the context of a detailed discussion thereof taken in conjunction with associated Figures thereto, of which:

FIGS. 3 and 3A depict a one-way connector for use in the present invention;

FIG. 4 depicts a potted cable with both live and dummy wires;

FIGS. 12A, 12B and 12C depict another key system for use in the system of FIG. 10.

DESCRIPTION OF THE INVENTION

First, briefly in overview, the present invention is a combination of electrical and mechanical components that are integrated to form a network of barriers to preclude unauthorized starting and operation of a standard motor vehicle. In one embodiment, the system incorporates a standard distributor system that has been purposely mis-timed. It is well known that a distributor that is even slightly out of proper timing will retard if not wholly prevent operation of the car's internal combustion engine. Other embodiments involve separate interference with vehicle starting components, such as the starter motor. In each case, the system installation is important. Indeed, by customizing the installation, the system becomes non-uniform and invulnerable to systematic penetration. Operation of the system begins with a special purpose key—a key that includes, as a separate function, the storage of two coded values in addressable locations—one digital and one analog. The analog coded value is a numerical value corresponding to a specific resistor in the key. The digital code is a three bit value stored in a simple PROM. Both codes are accessed during the ignition process of the car and are utilized to effect authorized operation of the vehicle. If the digital coded value matches the stored value, the distributor time delay is removed, via the corresponding analog coded value, and the car engine will operate smoothly.

On the other hand, if the code fails to match, the system will not operate as the mis-timed distributor is not corrected and the engine is disabled. In addition, the system logic is such that an attempt to start the car without the proper coding will shut the starting circuitry down for a pre-set time period—e.g., ten minutes. This delay between attempts prevents a potential thief from using a variable code regimen to sequence through a series of coded values hoping that with time, it will randomly access the proper code.

In addition, the system is installed with selectively camouflaged hardware to hamper any effort to wire around the delay based circuitry in a time efficient manner. This includes using potted wires that mix dummy connections with the live connections, dummy lines and special attachment connectors made of hardened steel to prevent penetration and the use of hardened one-way steel fasteners for the connectors.

Figure 1:
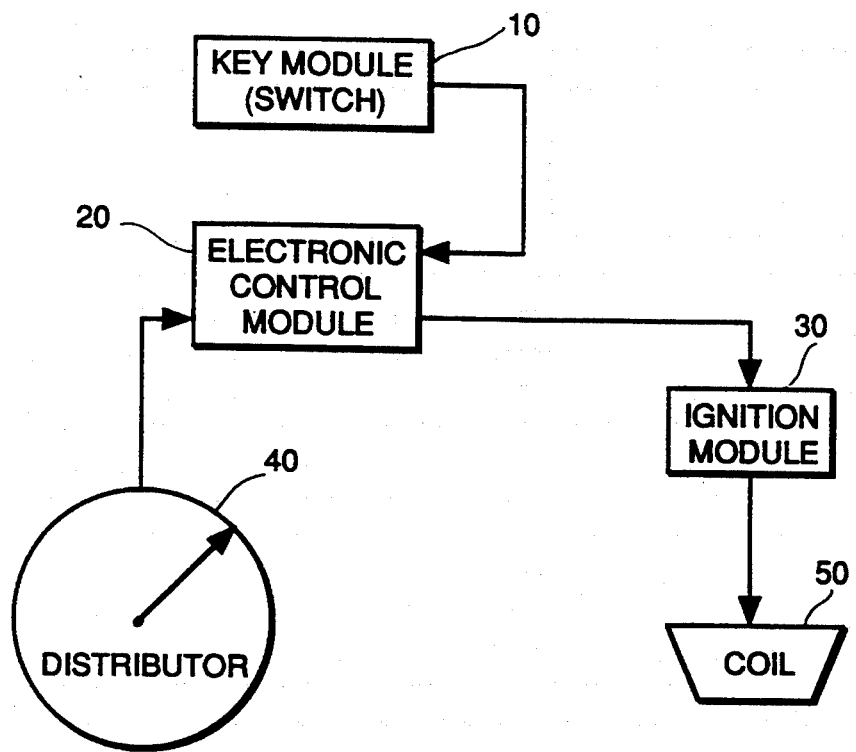
FIG. 1 is a schematic diagram of an existing ignition system for a typical car.

With the foregoing discussion in mind, attention is now directed to FIG. 1 wherein the starter system for a conventional automobile is depicted in schematic form. In this diagram, the key module block 10 is connected to the electronic control module block 20, dictating the operation of the ignition module block 30 based on the timing signal inputs from the distributor block 40. The ignition module is then connected to the coil to permit engine starting upon proper ignition key response. In operation, the conventional ignition key includes shape characteristics that match the key module an the connection is made. To operate without a key simply requires that the key module be infiltrated and the two connectors corresponding to the key reconnected directly—hot wired—thus energizing the system.

Figure 2:
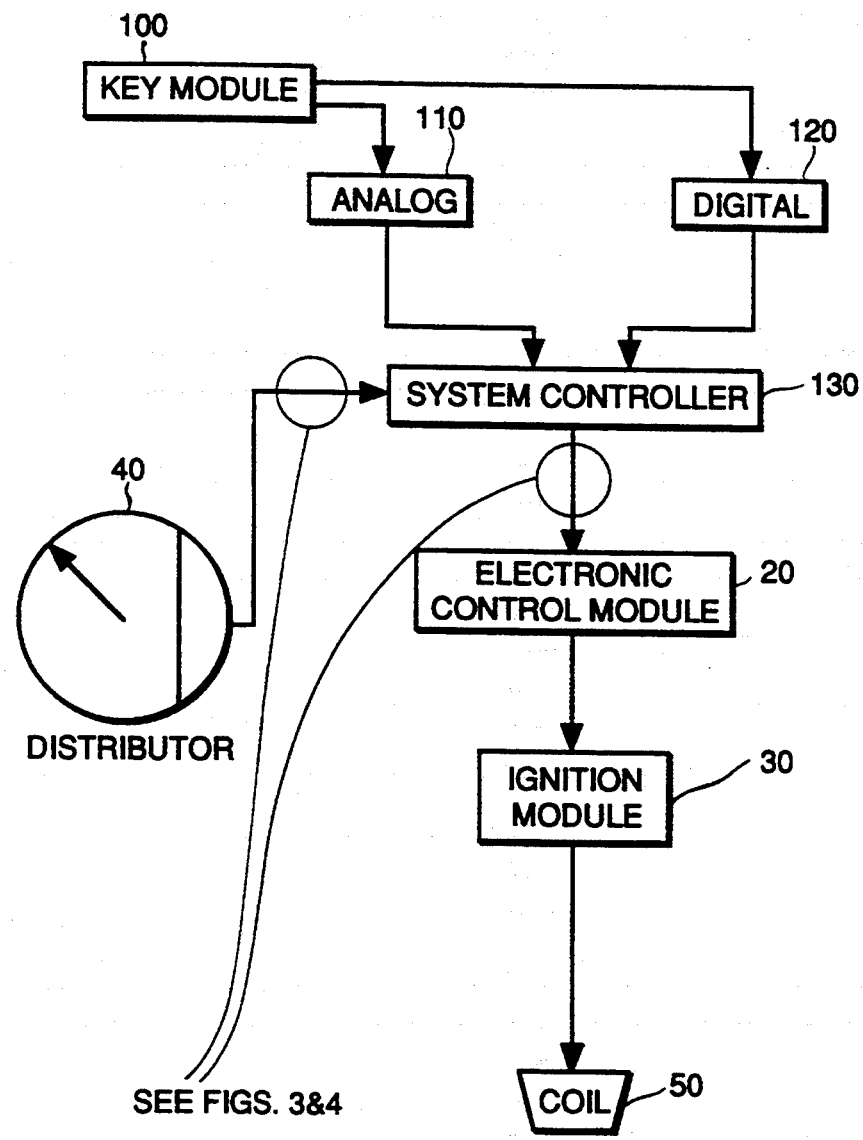
FIG. 2 is a block diagram of an ignition—distributor system modified to incorporate the inventive anti-theft system of the present invention.

Turning now to FIG. 2, the inventive system is shown in block diagram form. More particularly, the key module 100 is modified to receive additional information from the key during an ignition operation. This information is stored on the key in coded form in digital, analog or combinations of the two, to provide a coded response corresponding to an unique timing delay necessary to operate the vehicle. For example, the key may be equipped with a resistor of a certain value and a memory cell containing a 3 bit code. During key operation, the resistor is measured in the key and the 3 bit code read. This information is channeled to the System Controller 130 via discriminator/ decoder blocks 110 (analog read) and 120 (digital read), respectively. In this approach, the analog coded value corresponds to a time delay.

Concurrently therewith, the key activates the starter motor turning, inter alia, the distributor 40. The distributor has been pre-set with a timing value offset (a built-in timing distortion) corresponding to the analog value inputted via the key's resistor. This timing distortion is removed by the correct value in the key, and a properly timed ignition control signal passes to the remainder of the system as depicted by blocks 20, 30 and 50 in FIG. 2.

The use of a key with an incorrect resistive value or 3 bit code not corresponding to that car or ignition system is read by the system logic as a failed ignition attempt. This leads to two events. First, the distributor 40 timing signals pass through System Controller 130 without correction. Without the timing delay removed from the timing signals, ignition is prevented directly. Moreover, the system reads the failed ignition attempt and disengages the ignition system for a set time interval (say 10 minutes) thus precluding a second key activation for this interval. This interval prevents efforts to defeat the system by trial and error techniques.

Turning now to FIGS. 3, 3A and 4, several other aspects of the integrated system are depicted and implemented at the locations designated in FIG. 2. In FIGS. 3 and 3A, the use of special connectors 200 are shown, wherein the connectors have barbed attachment slips 210 to preclude easy separation of the metal interconnects 220.

Moreover, the entire casing is shielded in case hardened steel to prevent cutting. The wires leading into these connectors are potted in a plastic sheath without any color coding (see, FIG. 4). The live and active wires are also commingled with dummy wires that in all other appearances are indistinguishable with the active wires. In fact, these dummy wires are installed as either connected to the line voltage (12 volts) or grounded—further disguising the fact that the dummy lines are inoperative. In fact, the location, use and connection of the various live and dummy lines can be accomplished in a myriad of distinct arrangements. Accordingly, a creative installer can change each installation via the interconnects, rendering each system non-standard. Taken in combination, these features render it extremely difficult to locate via volt-ohm meter wires of interest in circumventing the system.

Figure 5:
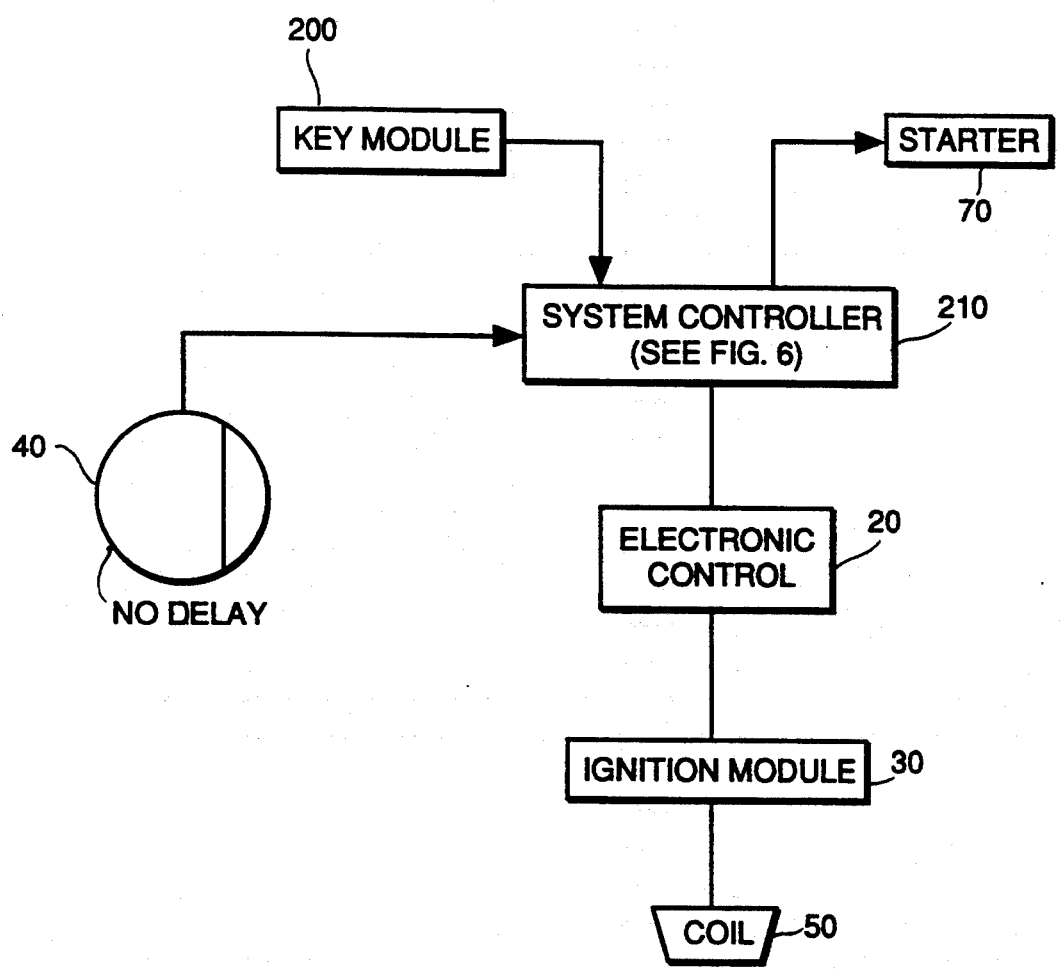
FIG. 5 provides a block diagram of the second inventive embodiment.

A second embodiment of the present invention is depicted in FIG. 5. In this structure, the key system 200 includes a coded value—but one that is unrelated to the timing of the distributer 40 which is otherwise properly timed in all respects. In substitution for the timing delay, the System Controller 210 includes a series of relays (shown in greater detail in FIG. 6) connecting power to both the starter motor 70 and coil 50.

Figure 6:
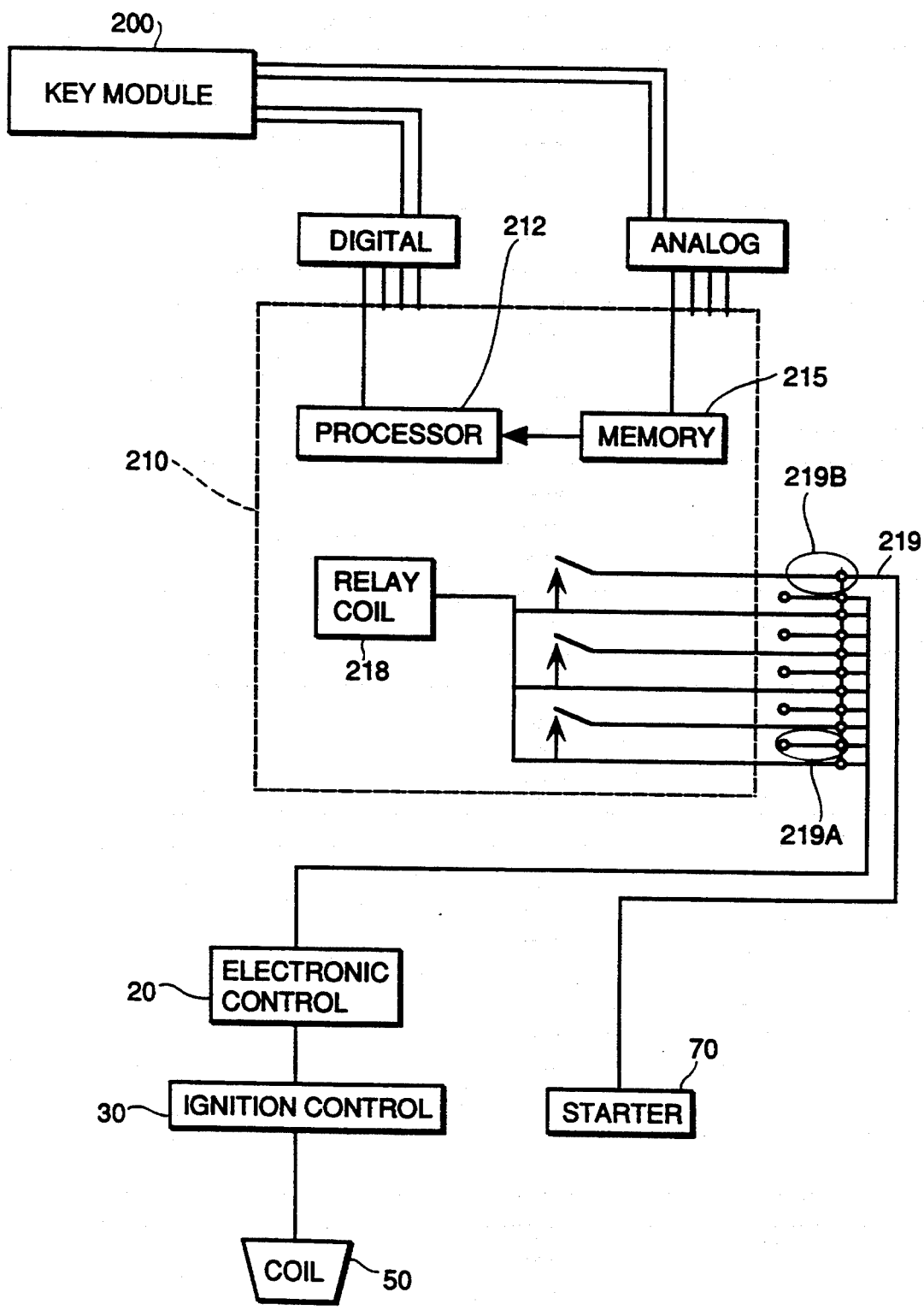
FIG. 6 provides the details of the System Controller of FIG. 5.

In this regard and turning to FIG. 6, the key contains a coded value that is matched to a stored value in the System Controller's processor block 212. As can be seen, the connections between the key module 200 and the System Controller 210 include numerous dummy lines intermixed with the connections through the analog and digital decoders. Processor 212 reads the coded value for that car from memory 215—if a match is made, relay coil 218 is energized and the relays are activated, closing the circuits to the ignition and starter. If the coded value does not match, the relays are left open and power to the coil and starter precluded. The connectors between the System Controller and the connection block 219 also include numerous dummy connections 219A intermixed with actual connectors 219B with the entire bundle of "uncoded" cables potted in insulating material.

Figure 7:
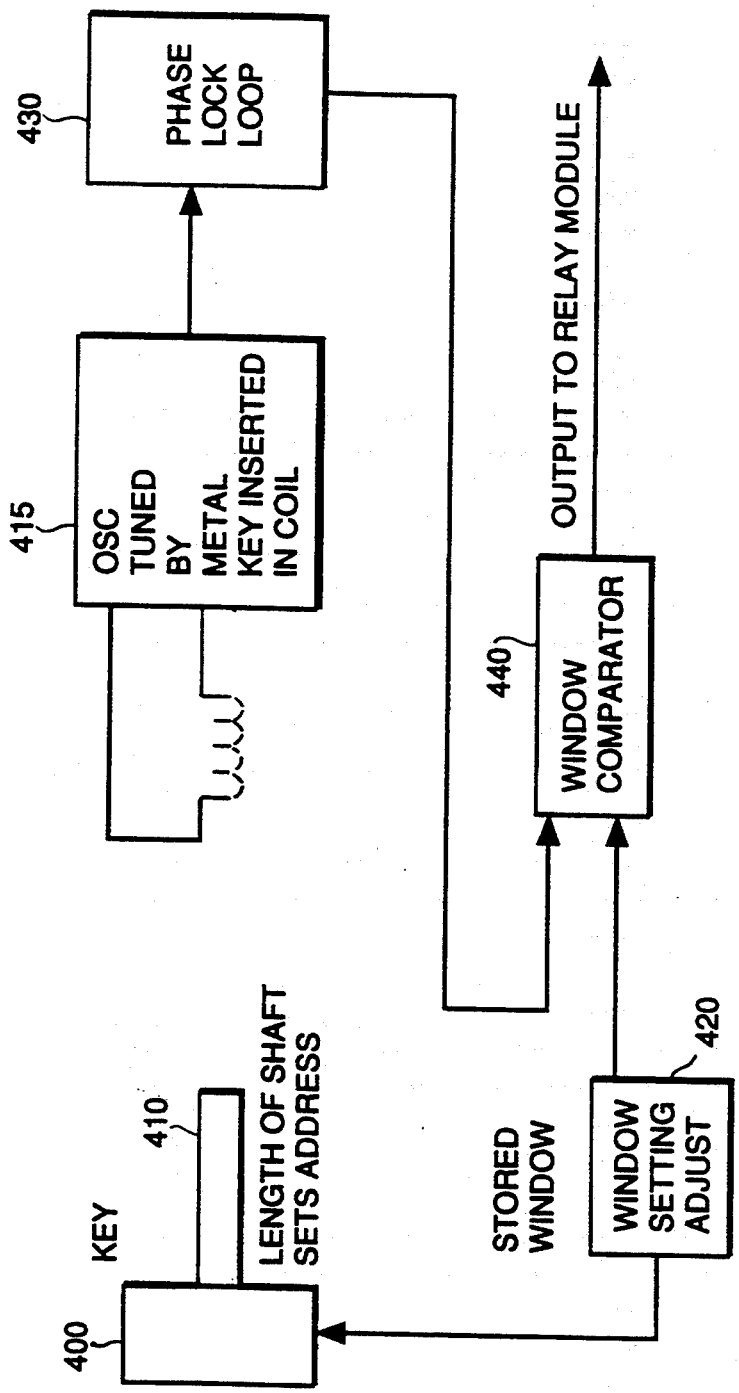
FIG. 7 provides a schematic diagram of a non-contacting key system based on inductance.
Figure 8:
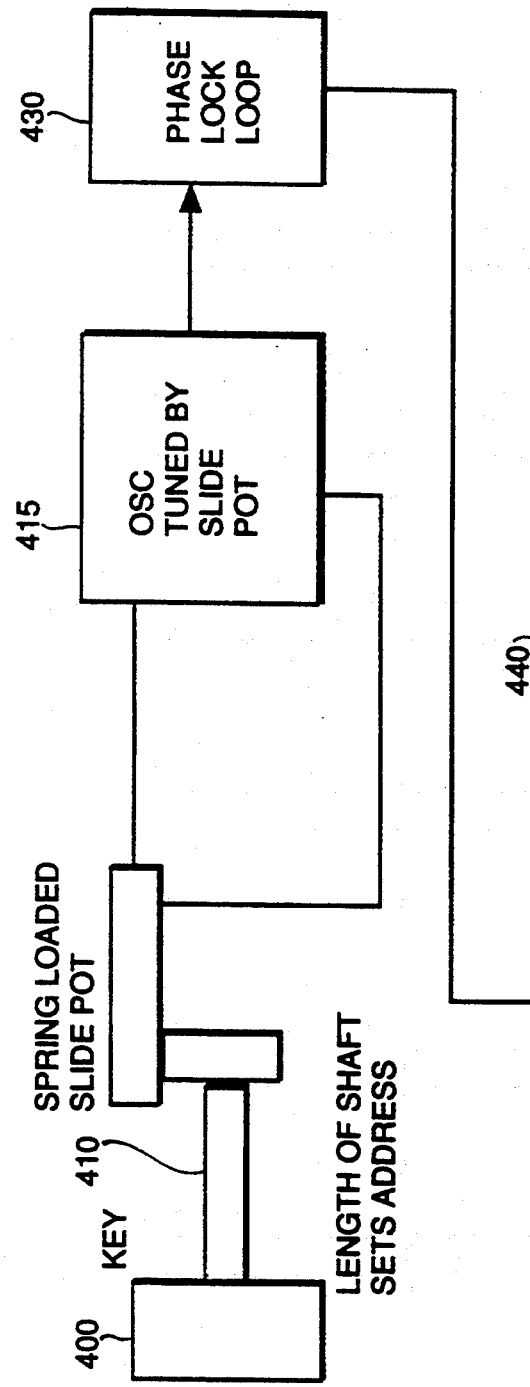
FIG. 8 provides a schematic diagram of a non-contacting key system based on a sliding potentiometer.
Figure 9:
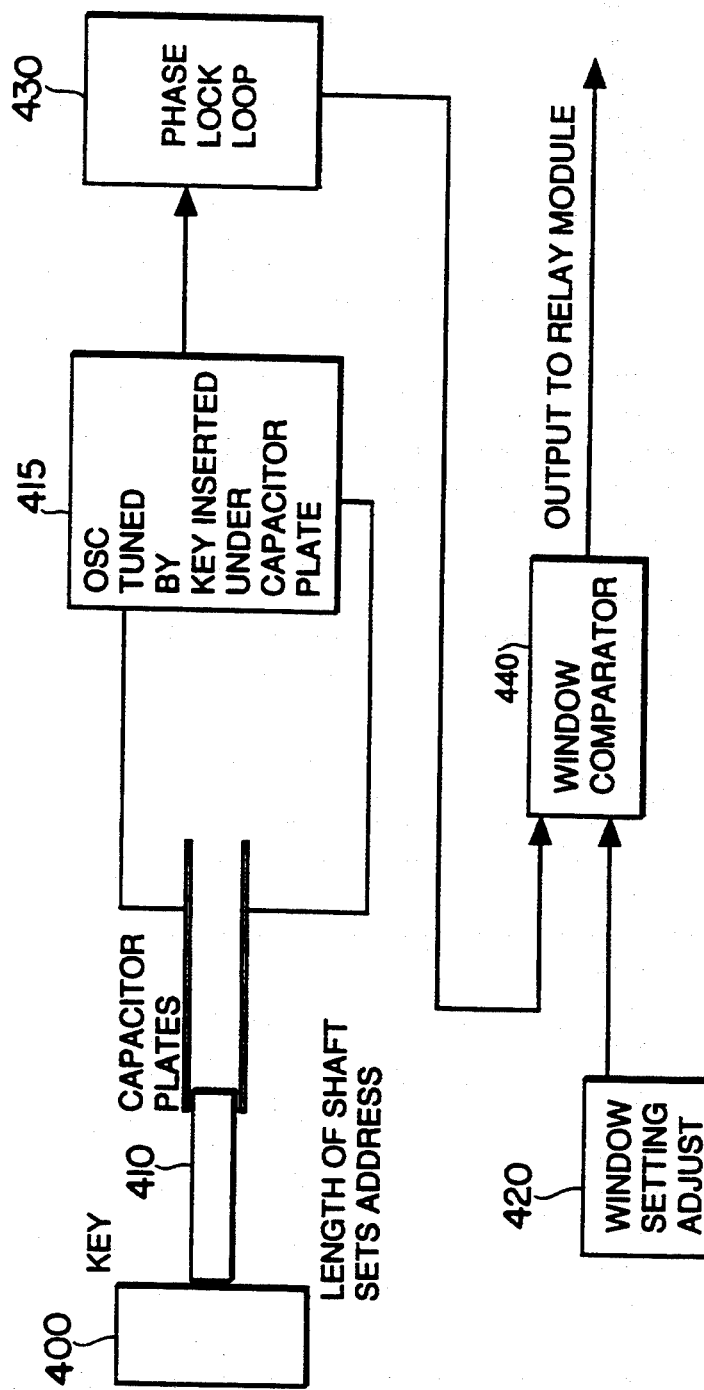
FIG. 9 provides a schematic diagram of a non-contacting key system based on a variable capacitor.

Turning now to FIGS. 7–9, a series of different key module configurations are depicted that may be used to transfer the analog coded value called for in each of the 5 above configurations. More particularly, in FIG. 7, the key 400 includes a metal shaft 410 forming a variable length inductor that is coupled block 415 to a phased lock loop 430 to monitor coded values and compare these to stored or inputted values for processing, via window comparator 440 based on the settings from memory 420. Memory 420 may be modified via key input as a second system check.

FIG. 8 depicts a similar system, but uses a sliding potentiometer to discriminate the value based on the length of the inserted portion of the key. In FIG. 9, the system discerns the coded value by the change in capacitance effected by the key insertion. Each of the above mechanisms are particularly useful when a non-contacting entry mechanism is needed.

Figure 10:
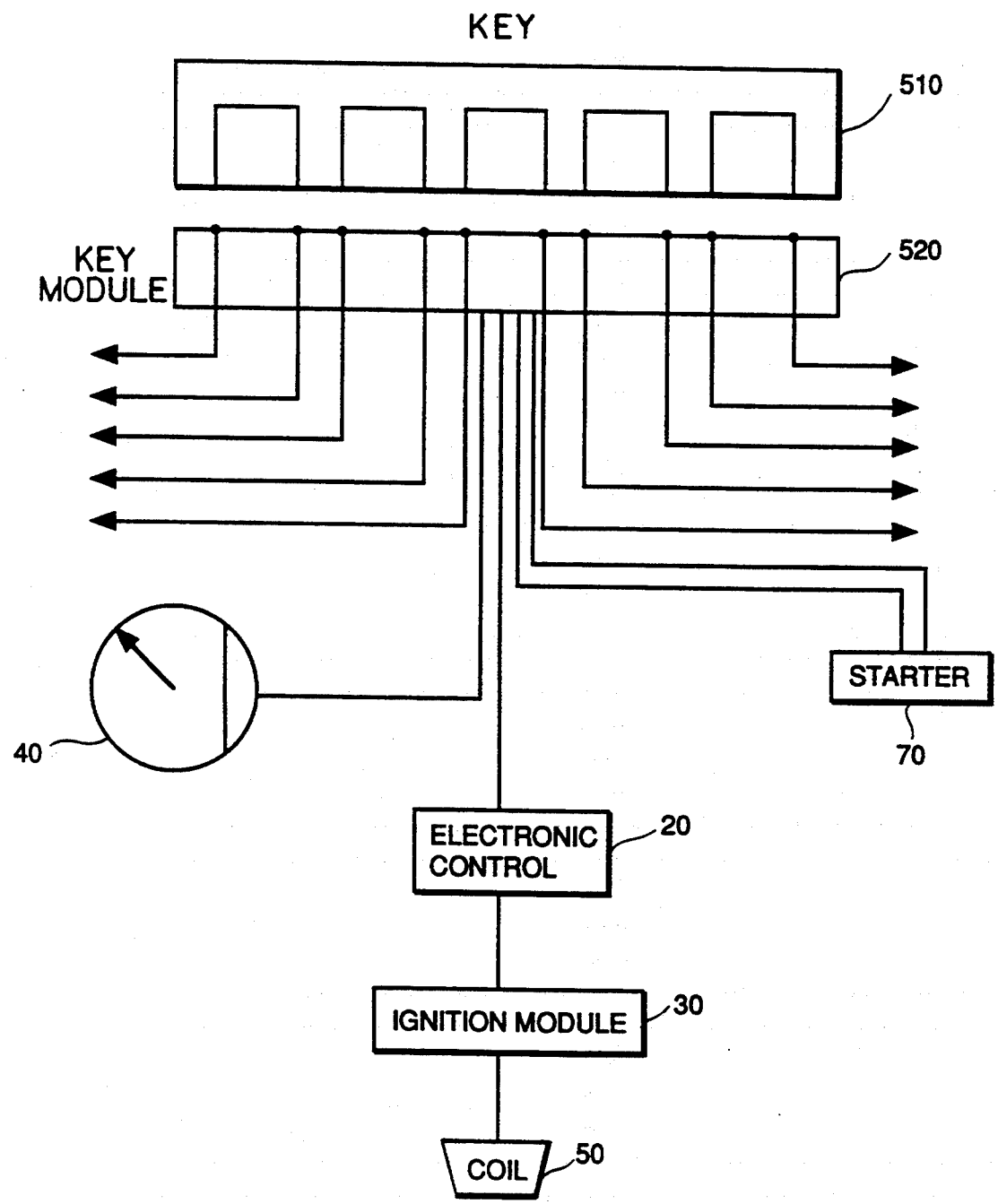
FIG. 10 provides a third embodiment of the inventive system in block diagram form.
Figure 11:
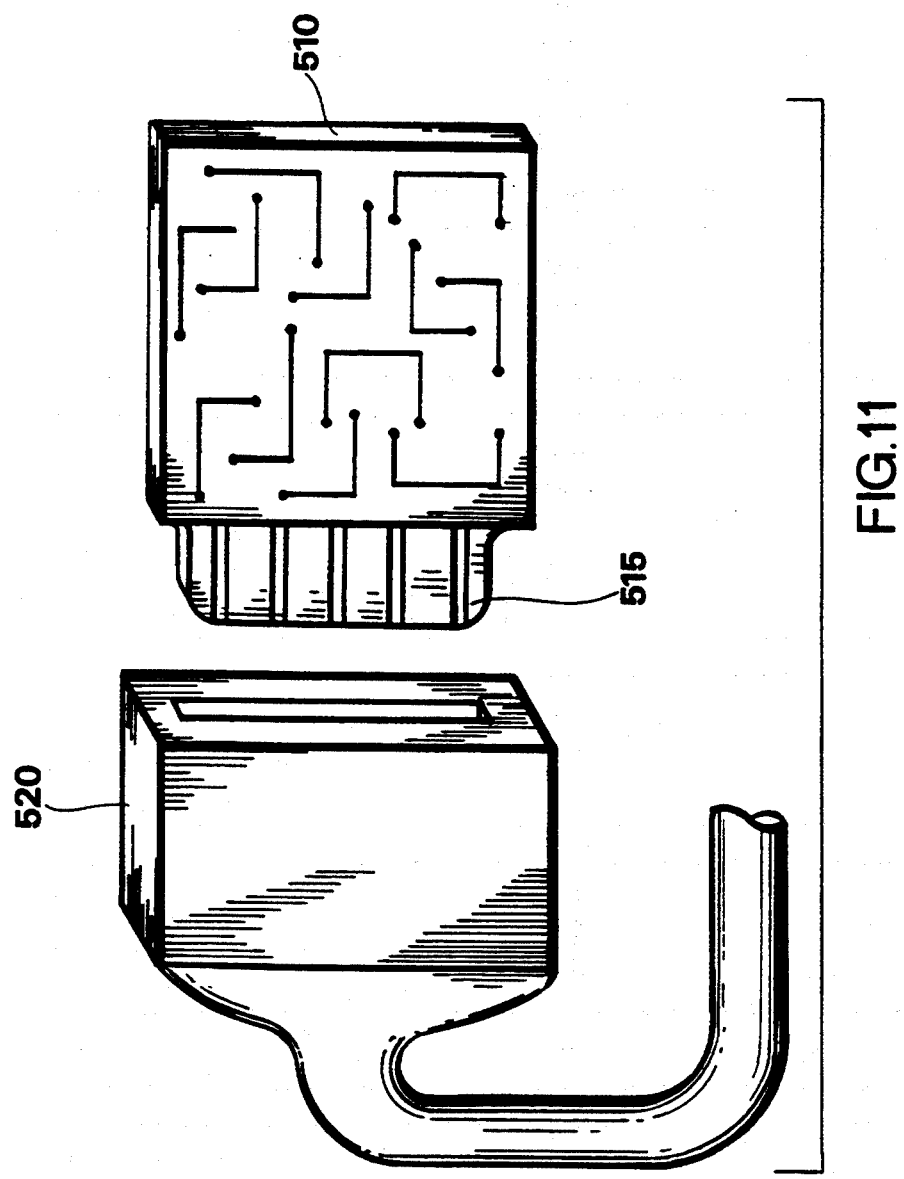
FIG. 11 depicts a key system for use in the system of FIG. 10.

A third embodiment of the inventive system is depicted in FIGS. 10 and 11, wherein the system is designed to be simpler and less expensive while remaining very effective. More particularly, the system does not use inputted coded values for comparison purposes, but employs the key as a "coded" switch for closing Connections to key components in the vehicle. In this regard, and referring to FIG. 10, the distributor is properly timed and wired directly to the key module 520, as is the starter 70. The key 510 is formed as an encased printed circuit board (PCB) with external contactors 515 in accordance with an unique combination of linkages for the designated vehicle. (See, FIG. 11) These contactors/connections act to link the power to the starter and channel the timing signals to the coil when properly inserted in module 520. Of importance is the fact that module 520 further includes numerous dummy lines that are connected throughout the vehicle in an idiosyncratic manner governed to the most part by the system installer. This renders location and identification of the power and timing lines in a time efficient and systematic process virtually impossible.

In addition to and to supplement the above arrangement shown in FIG. 11, FIGS. 12A, 12B and 12C depict a key structure designed to preclude the analysis of the contacts within the key module 520 of FIG. 11. In this regard, key 600 has arranged on its shaft 610 a series of connector contacts corresponding in location with a mating set of contacts arranged and embedded key receiver 620. Importantly, a guide in the receiver corresponds to a key slot 625 to permit accurate engagement between the key and the receiver 620. As in FIG. 11, the receiver is supplied with a plethora of dummy connectors 635 in potted lines to preclude rapid determination of active lines.

The key of FIGS. 10, 11, 12A, 12B and 12C can also include other circuitry taken from the electronic control module 20, and/or ignition module 30. By placing these circuits in the key, effective operation of the unit is precluded without the key. And, by disguising the controlling lines, mere component substitution would not be a reasonable mechanism to avoid the missing circuit.

The above-described arrangement is merely illustrative of the principles of the present invention. Numerous modifications and adaptations thereof will be readily apparent to those skilled in the art without departing from the spirit and scope of the present invention.

What is claimed is:

1. In combination in a system for preventing unauthorized operation of a motor vehicle comprising:
   a. key module means for receiving a key containing coded values corresponding to a timing offset in a distributor means in said motor vehicle, said offset in either digital or analog format and extracting these coded values for decoding;
   b. System Controller means for receiving coded values from said key module means and processing said values to allow an output of a properly timed distributer timing signal pursuant to receipt of said values that correspond to an authorized use of the vehicle;
   wherein said system controller means receives a timing signal from said distributor offset by a known amount and said received coded values are used in said controller means to modulate and correct said offset if authorized.

2. The system of claim 1, wherein said key module means includes means to decode an analog coded value, providing an analog signal timing offset to said System Controller means.

3. The system of claim 2, wherein said System Controller means further includes a means to create a time interval for failed attempts to provide a proper timing code to said System Controller means wherein system operation is shutdown completely during the duration of said time interval.

4. The system of claim 3, wherein said System Controller means is connected to one or more components in said motor vehicle by potted cables which include both line and dummy lines.

5. The system of claim 4, wherein said potted cables are non-color coded and connected by connector fittings encased in hardened steel.

6. The system of claim 5, wherein said cables are run throughout said motor vehicle in a deliberately arbitrary pattern by the installer.

7. In combination in a method to prevent unauthorized operation of a motor vehicle comprising the steps of:
   a. installing in said motor vehicle a key module means capable of accessing from a key a unique coded value permitting operation of said motor vehicle;
   b. installing in said motor vehicle a System Controller means;
   c. connecting said key module means to said System Controller means;
   d. connecting a distributor system to said System Controller means; and
   e. connecting said System Controller means to an ignition system, wherein said distributor system provides a timing signal to said System Controller means that has a timing delay which is corrected by said System Controller means only upon receipt of a proper coded value from said key module means.

8. The method of claim 7, wherein said key module means provides an output of a coded value upon activation by a removable key, wherein said removable key includes stored data corresponding to said coded value.

9. The method of claim 8, wherein said connecting steps (c) and (d) include connection of plural dummy lines in potted cables.

10. The method of claim 9, wherein said coded value corresponds to the existing time delay in said distributor system.

11. The method of claim 10, wherein said connecting steps use connectors made with case-hardened steel.

* * * * *